United States Patent
Sajwan (10) Patent No.: US 11,727,191 B2
(45) Date of Patent: Aug. 15, 2023

(54) PROCESS FOR HIGHLIGHTING TEXT WITH VARIED ORIENTATION

(71) Applicant: Schlumberger Technology Corporation, Sugar Land, TX (US)

(72) Inventor: Mohit Sajwan, Pune (IN)

(73) Assignee: Schlumberger Technology Corporation, Sugar Land, TX (US)

(*) Notice: Subject to any disclaimer, the term of this patent is extended or adjusted under 35 U.S.C. 154(b) by 71 days.

(21) Appl. No.: 17/595,437

(22) PCT Filed: May 21, 2020

(86) PCT No.: PCT/US2020/033906
§ 371 (c)(1),
(2) Date: Nov. 17, 2021

(87) PCT Pub. No.: WO2020/236997
PCT Pub. Date: Nov. 26, 2020

(65) Prior Publication Data
US 2022/0253587 A1    Aug. 11, 2022

(30) Foreign Application Priority Data

May 21, 2019  (IN) .............. 201921020069

(51) Int. Cl.
*G06F 17/00*  (2019.01)
*G06F 40/106* (2020.01)
(Continued)

(52) U.S. Cl.
CPC .......... *G06F 40/106* (2020.01); *G06F 40/166* (2020.01); *G06T 11/60* (2013.01); *G06V 30/1478* (2022.01); *G06V 30/413* (2022.01)

(58) Field of Classification Search
CPC .... G06F 40/106; G06F 40/166; G06F 40/103; G06F 40/109; G06T 11/60; G06V 30/1478; G06V 30/413
See application file for complete search history.

(56) References Cited

U.S. PATENT DOCUMENTS 6,230,171 B1   5/2001  Pacifici et al.
7,966,623 B2   6/2011  Chandra
(Continued)

FOREIGN PATENT DOCUMENTS

JP    1995037116 A   2/1995

OTHER PUBLICATIONS

Nov. 10, 2021_International Search Report and Written Opinion for the equivalent PCT/US20/033906 dated Sep. 3, 2020.
(Continued)

*Primary Examiner* — Laurie A Ries
(74) *Attorney, Agent, or Firm* — Michael Guthrie (57) ABSTRACT

A computer-implemented method and apparatus for highlighting text in an image disposed in a markup language document are disclosed. Location data identifying a location, size and orientation of a text element in the image may be obtained, where the text element is oriented in a direction that is non-orthogonal to vertical and horizontal axes of the image. A context for a canvas element in the document may be obtained and rotated to align the context to the orientation of the text element using the location data. The context may also be translated to the location of the text element using the location data, and a text highlighting element that at least partially overlays the text element may be generated.

19 Claims, 8 Drawing Sheets

(51) Int. Cl.
*G06F 40/166* (2020.01)
*G06V 30/413* (2022.01)
*G06V 30/146* (2022.01)
*G06T 11/60* (2006.01)

(56) References Cited

U.S. PATENT DOCUMENTS

| | | | |
|---|---|---|---|
| 9,224,061 B1 | 12/2015 | Natarajan et al. | |
| 10,223,341 B1* | 3/2019 | Jain | G06F 40/103 |
| 10,296,570 B2* | 5/2019 | Saund | G06F 40/106 |
| 11,620,439 B2* | 4/2023 | Welinder | G06T 7/194 |
| | | | 715/229 |
| 2002/0124025 A1 | 9/2002 | Janakiraman et al. | |
| 2004/0027381 A1* | 2/2004 | Jaeger | G06F 3/0481 |
| | | | 715/764 |
| 2006/0117255 A1* | 6/2006 | Seeler | G06F 40/106 |
| | | | 715/252 |
| 2010/0174732 A1 | 7/2010 | Levy et al. | |
| 2012/0033889 A1* | 2/2012 | Fukunaga | G06V 30/413 |
| | | | 382/190 |
| 2012/0042236 A1 | 2/2012 | Adler, III et al. | |
| 2012/0083294 A1 | 4/2012 | Bray et al. | |
| 2012/0251001 A1* | 10/2012 | Hsu | G06T 7/162 |
| | | | 382/173 |
| 2013/0222385 A1* | 8/2013 | Dorsey | G06T 11/20 |
| | | | 345/427 |
| 2015/0022549 A1* | 1/2015 | Khosravy | H04W 4/026 |
| | | | 345/629 |
| 2015/0205773 A1* | 7/2015 | Leventhal | G06F 40/143 |
| | | | 715/234 |
| 2016/0210507 A1 | 7/2016 | Abdollahian | |

OTHER PUBLICATIONS

Anonymous, "HTML Canvas—Rotating images on canvas—2-D transformations", retrieved from the internet on Apr. 26, 2023 from [https://web.archive.org/web/20111030014015/http://falcon80.com/HTMLCanvas/CanvasTransformations/Rotate.html] dated Oct. 30, 2011, 2 pages.
Extended Search Report issued in European Patent Application No. 20809252.8 dated May 8, 2023, 6 pages.

* cited by examiner

PROCESS FOR HIGHLIGHTING TEXT WITH VARIED ORIENTATION

CROSS REFERENCE PARAGRAPH

This application claims the benefit of Indian Non-Provisional Application No. 201921020069, entitled "PROCESS FOR HIGHLIGHTING TEXT WITH VARIED ORIENTATION," filed May 21, 2019, the disclosure of which is hereby incorporated herein by reference.

BACKGROUND

Text highlighting is supported by numerous computer software applications, e.g., to highlight particular terms or phrases searched for by a user, including, for example, markup language documents such as HTML documents that may include text and/or images incorporating text. However, in many applications, all text is oriented horizontally, or in some instances, vertically (e.g., at a 90 degree offset from horizontal), and highlighting such text is generally a straightforward operation. For other software applications, however, it may be desirable to orient text in different arbitrary orientations, e.g., when displaying labels on maps or other spatially-oriented data visualizations. Such arbitrarily-oriented text, for example, is used in many applications used in the oil & gas industry. In addition, where text is disposed in an image, any rotation of the image may result in text that, while oriented horizontally or vertically within the image, may nonetheless be at a non-horizontal and non-vertical orientation from the perspective of a document within which the image is disposed.

Conventionally, when text is oriented at an angle other than 0 degrees or 90 degrees, text highlighting is typically not possible or not accurate, such that even a slight change in the angle may alter the text highlighting effect and may result in a negative user experience. In some instances, some applications may even simply ignore text not oriented at 0 degrees or 90 degrees, which reduces the application's functionality, particularly if a search is conducted for a particular term and that term is never highlighted. A need therefore exists in the art for a manner of highlighting text at various angles of orientation, particularly text found in images in HTML and other markup language documents.

SUMMARY

The embodiments disclosed herein provide a method, apparatus, and program product for highlighting text at any arbitrary orientation in an image disposed in a markup language document (e.g. HTML), in part by rotating and/or translating a context of a canvas element in the markup language document.

Therefore, consistent with one aspect of the invention, a computer-implemented method for highlighting text in an image disposed in a markup language document is described, the method including: obtaining, by a processor, location data identifying a location, size and orientation of a text element in the image, where the text element is oriented in a direction that is non-orthogonal to vertical and horizontal axes of the image; obtaining, by the processor, a context for a canvas element in the document; rotating, by the processor, the context for the canvas element to align the context to the orientation of the text element using the location data; translating, by the processor, the context for the canvas element to the location of the text element using the location data; and generating, by the processor, a text highlighting element having a size that at least partially overlays the text element on the rotated and translated canvas using the location data.

In some embodiments, the computer implemented method may additionally include: saving, by the processor, the context for the canvas element in the document, where the text element is oriented in the direction that is non-orthogonal to vertical and horizontal axes of the image; and clearing, by the processor, the context for the canvas element prior to rotating and translating the context for the canvas element. In some embodiments, the computer implemented method may additionally include restoring, by the processor, the context of the canvas element such that the text element is reoriented in the direction that is non-orthogonal to vertical and horizontal axes of the image following the generation of the text highlighting.

In some embodiments, the text element in the image is one of a plurality of text elements in the image, where first and second text elements of the plurality of text elements are oriented in first and second directions that are non-orthogonal to vertical and horizontal axes of the image. In some such embodiments, the computer implemented method may further include repeating the location data obtaining, the context obtaining, the rotating, the translating and the generating steps for each of the first and second text elements.

In some embodiments, rotating the context for the canvas element to align the context to the orientation of the text element using the location data further includes determining, by the processor, an angle of the text element in the image using the location data. In other embodiments, the angle of the text element equals $\tan^{-1}$ (slope), wherein the slope equals: (a Y coordinate of a top right corner of a bounding box−a Y coordinate of a top left corner of the bounding box)/(an X coordinate of the top right corner of the bounding box−an X coordinate of the top left corner of the bounding box).

In another aspect, an apparatus is described herein, where the apparatus includes: at least one processing unit; and program code configured upon execution by the at least one processing unit to highlight text in an image disposed in a markup language document including: obtaining location data identifying a location, size and orientation of a text element in the image, where the text element is oriented in a direction that is non-orthogonal to vertical and horizontal axes of the image; obtaining a context for a canvas element in the document; rotating the context for the canvas element to align the context to the orientation of the text element using the location data; translating the context for the canvas element to the location of the text element using the location data; and generating a text highlighting element having a size that at least partially overlays the text element on the rotated and translated canvas using the location data.

In some embodiments, the program code configured upon execution by the at least one processing unit to highlight text in an image disposed in a markup language document further includes: saving the context for the canvas element in the document, where the text element is oriented in the direction that is non-orthogonal to vertical and horizontal axes of the image; and clearing the context for the canvas element prior to rotating and translating the context for the canvas element. In some such embodiments, the program code configured upon execution by the at least one processing unit to highlight text in an image disposed in a markup language document may further include restoring the context of the canvas element such that the text element is reoriented in the direction that is non-orthogonal to vertical and horizontal axes of the image following the generation of the text highlighting.

In some embodiments, the text element in the image is one of a plurality of text elements in the image and where first and second text elements of the plurality of text elements are oriented in first and second directions that are non-orthogonal to vertical and horizontal axes of the image. In some such embodiments, the program code configured upon execution by the at least one processing unit to highlight text in an image disposed in a markup language document may further include repeating the location data obtaining, the context obtaining, the rotating, the translating and the generating steps for each of the first and second text elements.

In some embodiments, rotating the context for the canvas element to align the context to the orientation of the text element using the location data further includes determining an angle of the text element in the image using the location data. In some such embodiments, the angle of the text element equals $\tan^{-1}$ (slope), where the slope equals: (a Y coordinate of a top right corner of a bounding box–a Y coordinate of a top left corner of the bounding box)/(an X coordinate of the top right corner of the bounding box–an X coordinate of the top left corner of the bounding box).

In yet another aspect, a program product is described, the program product including: a computer readable medium; and program code stored on the computer readable medium and configured upon execution by at least one processing unit to highlight text in an image disposed in a markup language document including by: obtaining location data identifying a location, size and orientation of a text element in the image, where the text element is oriented in a direction that is non-orthogonal to vertical and horizontal axes of the image; obtaining a context for a canvas element in the document; rotating the context for the canvas element to align the context to the orientation of the text element using the location data; translating the context for the canvas element to the location of the text element using the location data; and generating a text highlighting element having a size that at least partially overlays the text element on the rotated and translated canvas using the location data.

In some embodiments, the program code configured upon execution by the at least one processing unit to highlight text in an image disposed in a markup language document may further include: saving the context for the canvas element in the document, where the text element is oriented in the direction that is non-orthogonal to vertical and horizontal axes of the image; and clearing the context for the canvas element prior to rotating and translating the context for the canvas element. In other embodiments, the program code configured upon execution by the at least one processing unit to highlight text in an image disposed in a markup language document further includes restoring the context of the canvas element such that the text element is reoriented in the direction that is non-orthogonal to vertical and horizontal axes of the image following the generation of the text highlighting.

In some embodiments, the text element in the image is one of a plurality of text elements in the image and wherein first and second text elements of the plurality of text elements are oriented in first and second directions that are non-orthogonal to vertical and horizontal axes of the image. In some such embodiments, the program code configured upon execution by the at least one processing unit to highlight text in an image disposed in a markup language document may additionally include repeating the location data obtaining, the context obtaining, the rotating, the translating and the generating steps for each of the first and second text elements.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 6A-6G illustrate simplified, schematic views of an exemplary process of highlighting text in an image disposed in a markup language document.

DETAILED DESCRIPTION

The herein-described embodiments provide a method, apparatus, and program product that highlight text in an image in a markup language document, where the text may be oriented at varying angles (e.g. in a direction that may be non-orthogonal to vertical and horizontal axes of the image). In some embodiments, location data of the text element, which may include the size and orientation of the text element, are obtained. A context of a canvas element in the document may then be obtained and manipulated in various manners described herein in order to generate a text highlighting element that may overlay at least a portion of the text.

Other variations and modifications will be apparent to one of ordinary skill in the art.

Hardware and Software Environment

Figure 1:
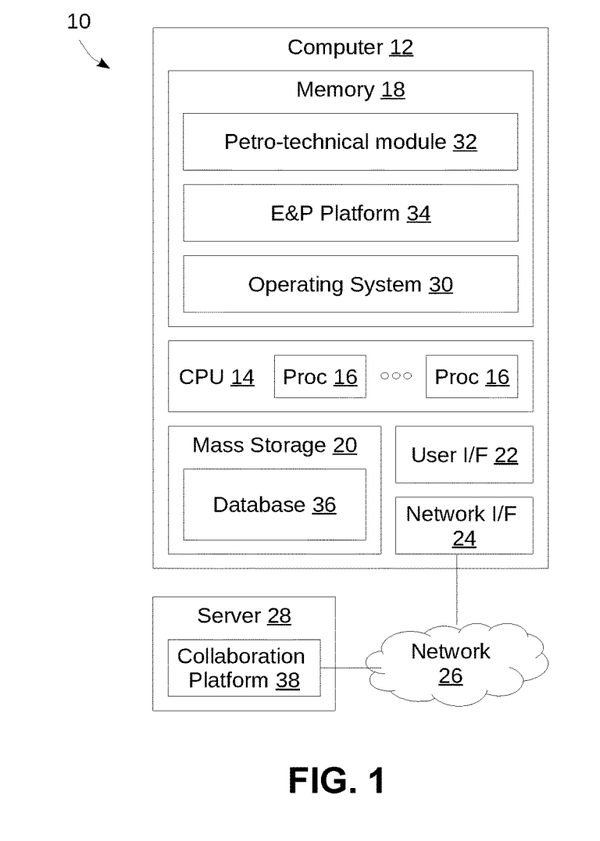
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16. CPU 14 is coupled to a memory 18, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 18 may be considered to include memory storage physically located elsewhere in a computer 12, e.g., any cache memory in a microprocessor or processing core, as well as any storage capacity used as a virtual memory, e.g., as stored on a mass storage device 20 or on another computer coupled to a computer 12.

Each computer 12 also generally receives a number of inputs and outputs for communicating information externally. For interface with a user or operator, a computer 12 generally includes a user interface 22 incorporating one or more user input/output devices, e.g., a keyboard, a pointing device, a display, a printer, etc. Otherwise, user input may be received, e.g., over a network interface 24 coupled to a network 26, from one or more external computers, e.g., one or more servers 28 or other computers 12. A computer 12 also may be in communication with one or more mass storage devices 20, which may be, for example, internal hard disk storage devices, external hard disk storage devices, storage area network devices, etc.

A computer 12 generally operates under the control of an operating system 30 and executes or otherwise relies upon various computer software applications, components, programs, objects, modules, data structures, etc. For example, a petro-technical module or component 32 executing within an exploration and production (E&P) platform 34 may be used to access, process, generate, modify or otherwise utilize petro-technical data, e.g., as stored locally in a database 36 and/or accessible remotely from a collaboration platform 38. Collaboration platform 38 may be implemented using multiple servers 28 in some implementations, and it will be appreciated that each server 28 may incorporate a CPU, memory, and other hardware components similar to a computer 12.

In one non-limiting embodiment, for example, E&P platform 34 may implemented as the PETREL Exploration & Production (E&P) software platform, while collaboration platform 38 may be implemented as the STUDIO E&P KNOWLEDGE ENVIRONMENT platform, both of which are available from Schlumberger Ltd. and its affiliates. It will be appreciated, however, that the techniques discussed herein may be utilized in connection with other platforms and environments, so the invention is not limited to the particular software platforms and environments discussed herein.

It will be appreciated that the herein-described techniques may be implemented in a number of different computers, computer systems, devices, etc. In some embodiments, the herein-described techniques may be implemented within a production computer. In other embodiments, the implementation may be within an on-site computer at an oil field, within a pump itself (e.g. a smart pump), in a well or pump controller, in a cloud service, in a remote server, in another computer or electric device, or in various combinations thereof.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

Figure 2A:
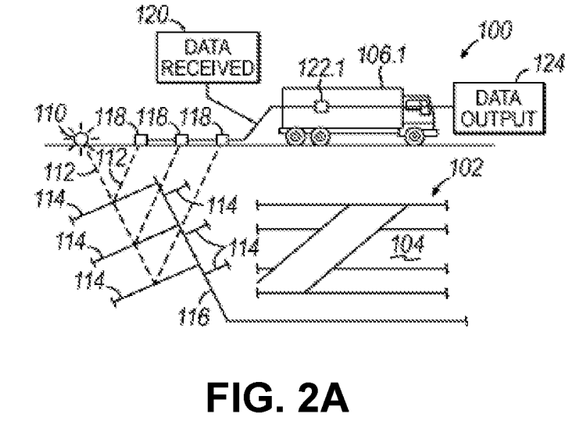
FIGS. 2A-2D illustrate simplified, schematic views of an oilfield having subterranean formations containing reservoirs therein in accordance with implementations of various technologies and techniques described herein.

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

Figure 2B:
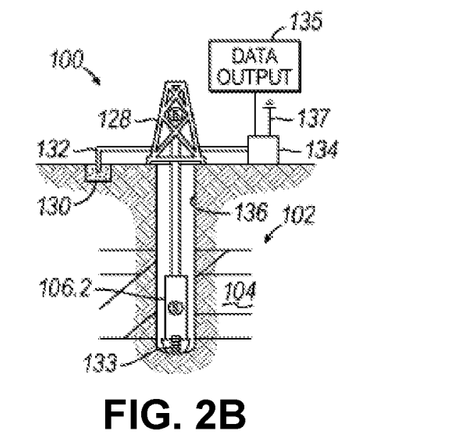

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

Figure 2C:
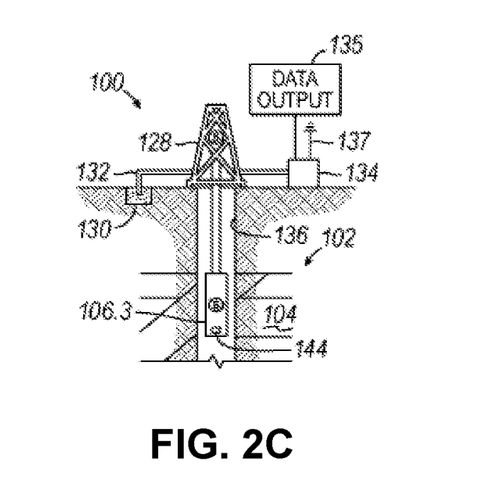

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

Figure 2D:
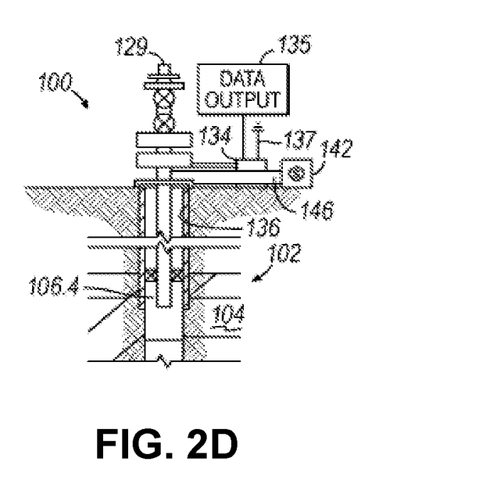

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
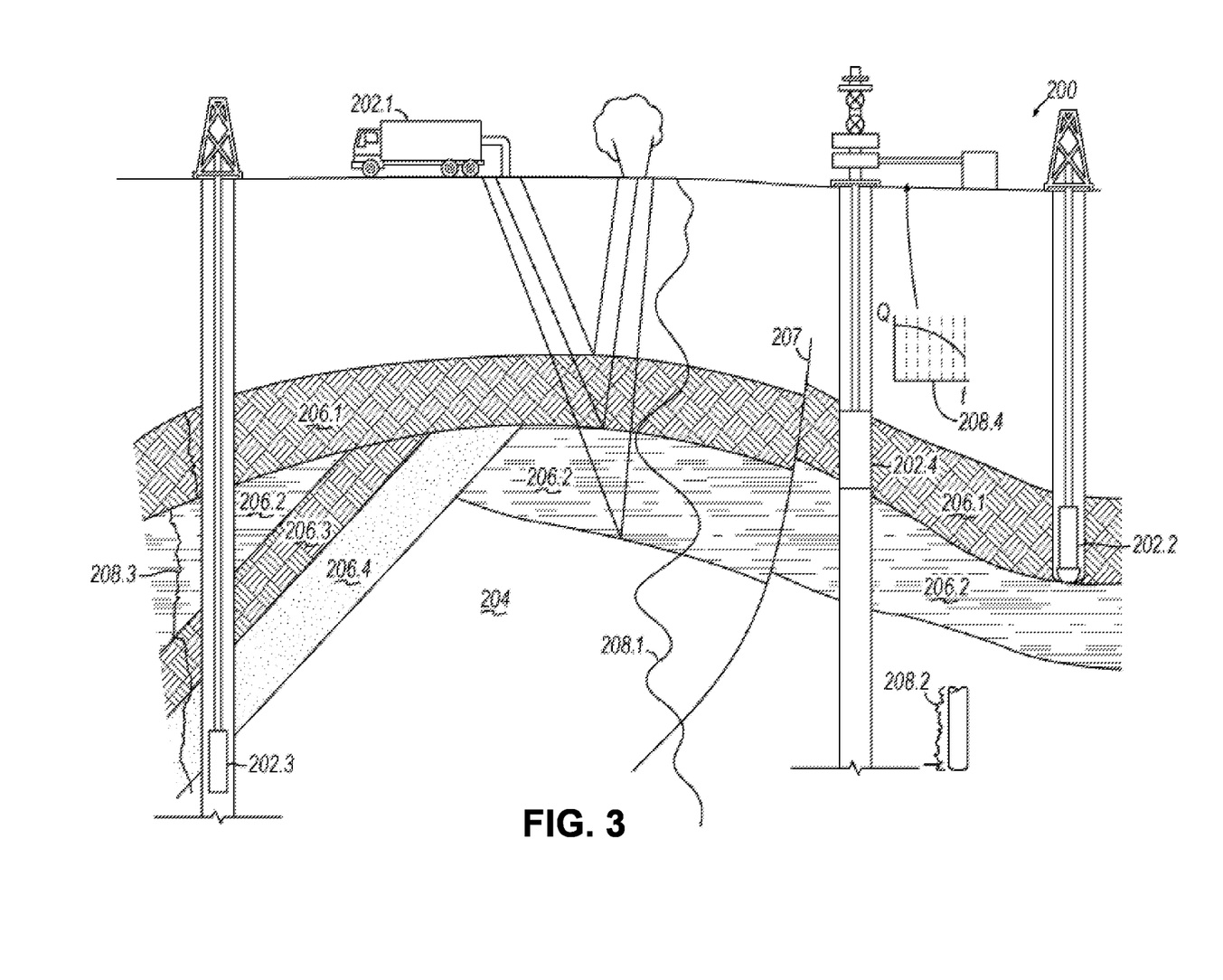
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
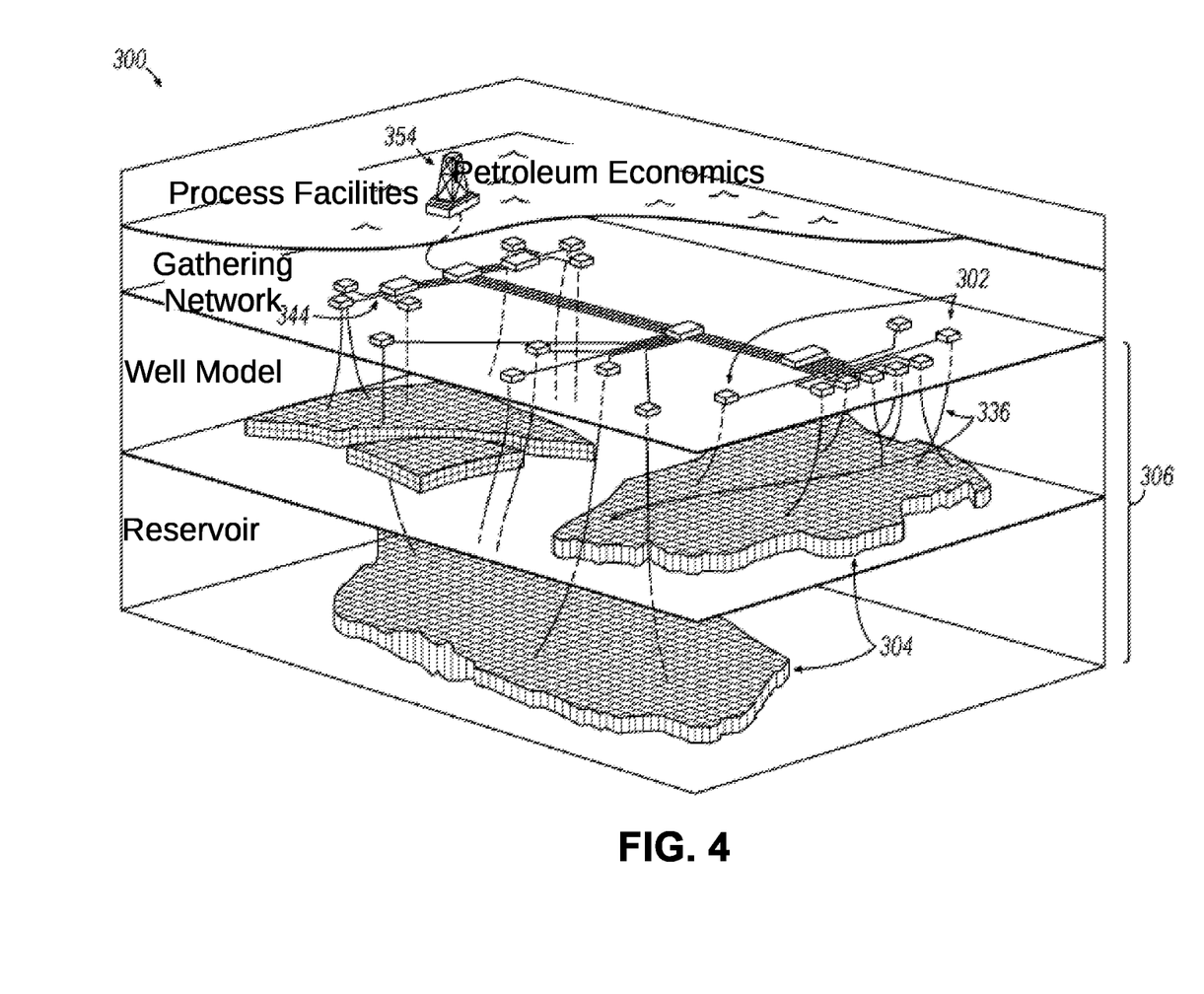
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Process for Highlighting Text with Varied Orientation

As previously mentioned, text highlighting is used in various user interface based applications, including those used in the oil and gas industry. In some applications, for example, markup language documents such as Hypertext Markup Language (HTML)-compatible markup language documents are used to display information to an end user, with the markup language documents including various tags or elements that describe how to render information in the document on a display screen. Text, for example, may be represented as a string of characters and including one or more tags or elements that describe how to format the characters to be rendered, e.g., using different fonts, colors, backgrounds, highlights, effects, etc. Text may also, however, be rendered within graphical images that are embedded in a markup language document, and various image processing techniques such as optical character recognition may be used to identify the text rendered within an image.

However, conventional text highlighting may be unable to accurately highlight text that is oriented at an angle other than 0 degrees or 90 degrees, particularly when that text is rendered in a graphical image. In many oil & gas applications, however, text may be oriented in various arbitrary angles, e.g., when incorporated into mapping data or into two-dimensional or three-dimensional data visualizations, and oftentimes the text may be oriented at an angle that is non-orthogonal to horizontal and vertical directions, e.g., the horizontal and vertical axes of an image. As such, a method of text highlighting that allows for accurate highlighting of text rendered within an image regardless of the orientation of the text may be desirable for some applications. As will become more apparent below, the described method of text highlighting may use a container, such as an HTML canvas element, that may be manipulated to a correct angle and position in order to highlight at least a portion of the text disposed at an arbitrary angle within an image of a hypertext markup language document.

Figure 5:
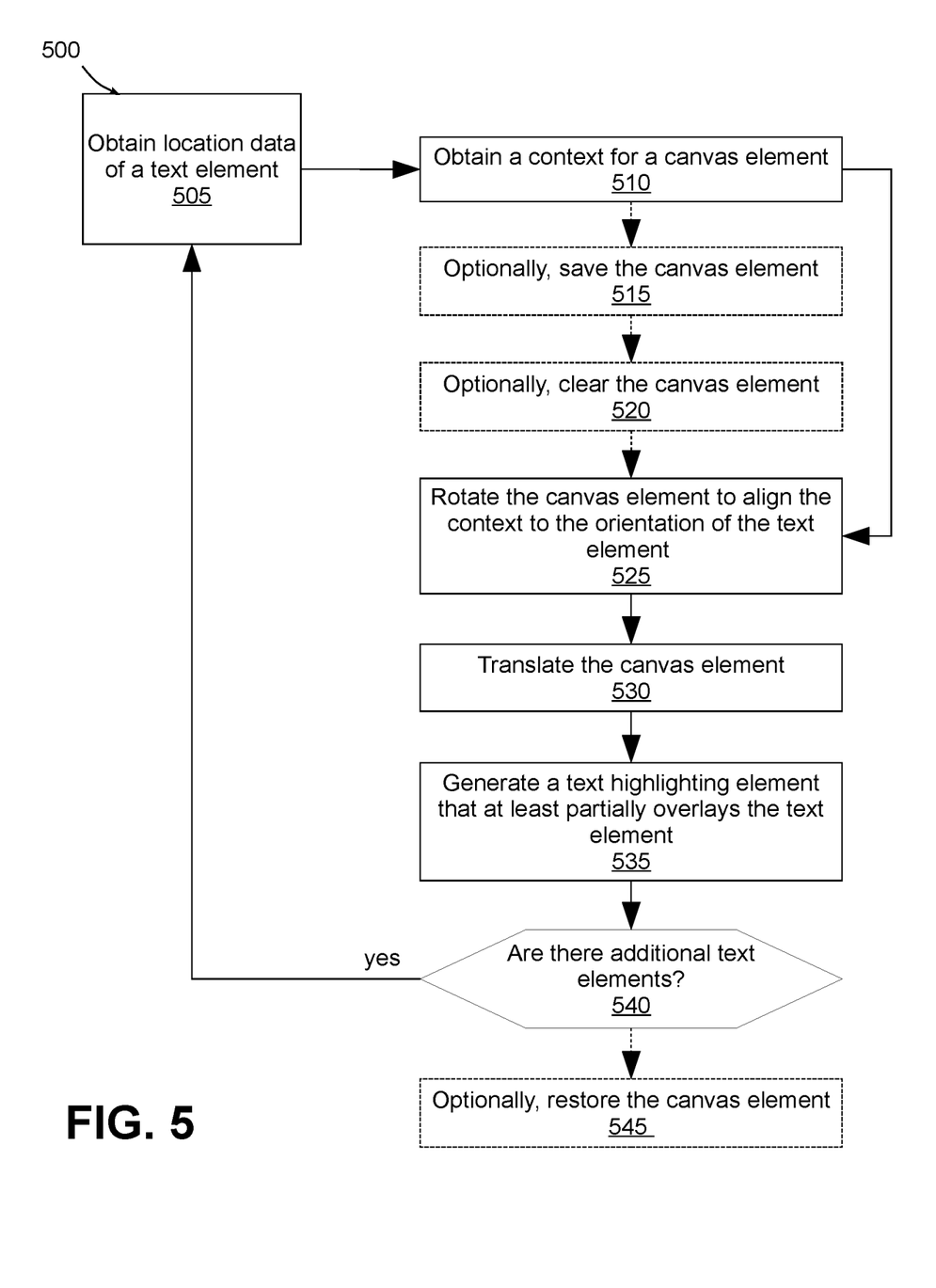
FIG. 5 is a flowchart illustrating an example sequence of operations for highlighting text in an image disposed in a markup language document using the data processing system of FIG. 1.

FIG. 5 illustrates a flowchart of an example sequence of operations 500 for highlighting text in an image disposed in a markup language document using the data processing system of FIG. 1. In the illustrated embodiment, the markup language document is a Hypertext Markup Language (HTML)-compatible document and the container is defined by an HTML canvas element, although other containers may be used in other embodiments in order to properly orient highlighting on an arbitrarily oriented text element. In addition, in the context of this disclosure, the text to be highlighted is referred to as a text element; however, the term text element is used to generically refer to one or more text characters that are represented in an image, and not to any specific markup language element or tag that may define text within a markup language document.

Sequence 500 begins at block 505, where a variety of location data may be obtained regarding the text element. The location data may be imported from any number of sources including, but not limited to, any one of the user interface based applications used in oil and gas production systems. In some instances, the location data may be the result of a keyword search and image processing (e.g., optical character recognition) of one or more images to identify one or more matching keywords in the image(s) within a markup language document. Cascading Style Sheets (CSS) may also be used to define the area where the text to be highlighted is present. However, CSS may not provide an exact location in some instances. The location data may be obtained in the form of a bounding box, or the X, Y coordinates of each corner (upper left, upper right, lower left, and lower right) of the bounding box. In some instances, additional location-based data points may be calculated from the bounding box and/or the X, Y coordinates of the same. For example, the length and width of the text element may be determined based on the perimeters of the bounding box. In another example, an X, Y coordinate of each corner may be used to calculate a slope and/or angle of rotation of the text element. In other instances, the height, width, slope, angle of rotation, and the like may be predetermined and obtained as a part of the location data.

At block 510, a context for a canvas in the markup language document may be obtained. The canvas of a markup language document may be used to draw various graphics, and may be defined, for example, using an HTML canvas element in some embodiments. A context of the canvas may provide a two-dimensional rendering of the drawing surface of the canvas; in some instances, the context may be used for drawing shapes, text, images, etc. In some instances, the canvas may then be optionally saved (block 515) and cleared (block 520) so that a fresh canvas may be used for the generation of the highlighted text element. In some embodiments, clearing the canvas may include removal of all graphics, text, etc., which may, in some instances, improve processing time since the canvas is empty.

At block 525, the canvas element is rotated so that the orientation of the context may be aligned with the text element. For example, in some embodiments, the angle of the rotation for the context may be identical to that of the angle of rotation of the text element (for example, as identified using the slope of the text element). However, in some embodiments, such as when utilizing HTML as the markup language, the center point of the rotation may be the canvas origin. The context of the canvas, similar to other two dimensional platforms, utilizes a flat Cartesian coordinate system with the origin (0, 0) positioned at the upper left of the context. Therefore, in some instances, in order for the context to be rotationally aligned with the text element, the canvas element may also be translated.

At block 530, the canvas may be translated such that each point of the text element moves in the same direction for the same distance. In some instances, the translation may be so that the upper left corner of the canvas (the origin) aligns with the upper left corner of the of text element. Such an alignment would allow the canvas to rotate to align with the text element. Furthermore, it is to be understood from the description herein that although described first that rotating the canvas and translating the canvas may occur in any order necessary to achieve alignment of the context with the text element.

At block 535, a text highlighting element is generated. In some instances, the text highlighting element may completely overlay the text element, for example in the form of a traditional colored highlight. In such instances, the highlighting element may be in the form of a transparent colored area with the same dimensions as the bounding box. A pale yellow color may be used in for the text highlighting element, but this is not to be understood as limiting, as any color may be used. The color may be defined, for example in HTML, by an RGBA (red, green, blue, alpha) color values. RGBA color values are an extension of RGB color values that include an alpha channel—which allows for the specification of an opacity for the defined color. For example, the alpha parameter may be a number between 0.0 (fully transparent) and 1.0 (fully opaque). In other instances, the text highlighting element may only partially overlay the text element, for example if the text highlighting element is an underline of the text element or a line crossing through the text element, or any other marking known in the art.

At block 540, a determination is made regarding whether there are any additional text elements to be highlighted, for example where the original canvas included multiple text elements to be highlighted. If there are additional text elements to be highlighted the sequence of operations 500 may be repeated for each remaining text element, one at a time, for each remaining text element beginning with obtaining the location data of the next text element (block 505). In some instances, once all of the text elements have been highlighted, the canvas may be restored (block 545) to its original state. In such instances, this restoration may include restoring all of the graphics, text, etc., that were cleared at block 520 and leaving the text element properly highlighted, so that the canvas is identical to its original state with the exception of the newly added text highlighting element.

Figure 6A:
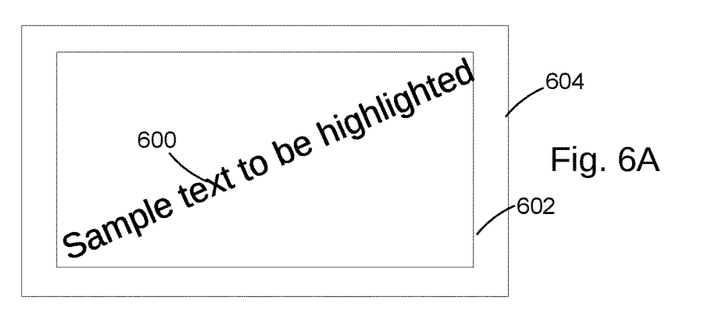
FIG. 6A is a schematic view of a text element to be highlighted.

FIGS. 6A-6G illustrate simplified, schematic views of an embodiment of a process described with reference to FIG. 5 for highlighting text in an image. For example, FIG. 6A illustrates the text element 600 to be highlighted in an image 602 of a canvas of a markup language document 604 (e.g. HTML). As is clear in FIG. 6A, the text element 600 may be at an angle other than 0 degrees or 90 degrees. For example, referring now to FIG. 6B, the text element 600 may be oriented in a direction that is non-orthogonal to vertical (Y) and horizontal (X) axes of the image. In some instances, the text element 600 to be highlighted may be identified by a user-initiated search of the document; and as such, there may be a plurality of text elements 600 to be highlighted. Although FIGS. 6A-6G only illustrate a single text element 600, it is to be understood that the process illustrated in FIGS. 6A-6G may be repeated for any number of text elements 600 to be highlighted.

Figure 6B:
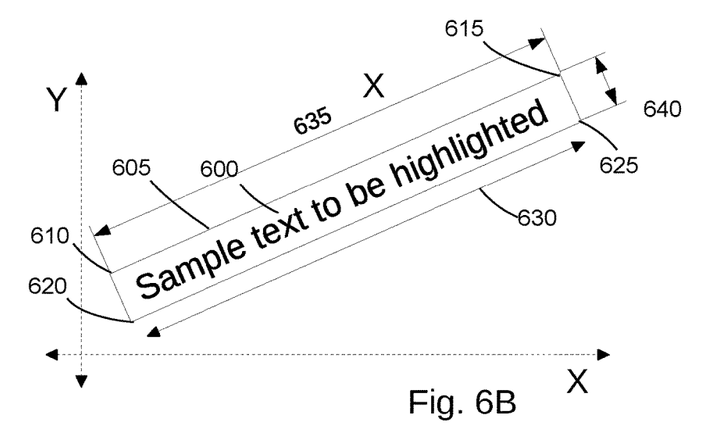
FIG. 6B is a schematic view of various location data obtained about the text element.

FIG. 6B illustrates various location data points that may be obtained regarding the text element 600. Generally, a bounding box 605 may be formed around the text element 605 defining a perimeter of the text. In some instances, this bounding box 605 may then to be used to determine a number of other location-based data points. For example, the length 635 and width 640 of the text element may be determined based on the perimeters of the bounding box 605. In another example, an X, Y coordinate of each corner (upper left 610, upper right 615, lower left 620, and lower right 625) of the bounding box 605 may be determined. In such instances, these coordinates may be used to calculate a slope 630 of the text element 600. For example, the slope may be calculated as:

$$\text{slope} = \frac{Y \text{ Coordinate of Upper Right } 615 - Y \text{ Coordinate of Upper Left } 610}{X \text{ Coordinate of Upper Right } 625 - Y \text{ Coordinate of Upper Left } 620}$$

An angle of rotation of the text element may also then be determined (in radian) from the calculated slope by:

$$\text{Angle of Rotation (radian)} = \tan^{-1}(\text{slope})$$

In some instances, particularly where the X coordinate of upper right 615 corner is less than the X coordinate of upper left corner, it may be desirable to add π radian and then divide by 180 degrees when determining the angle of rotation in radian.

Figure 6C:
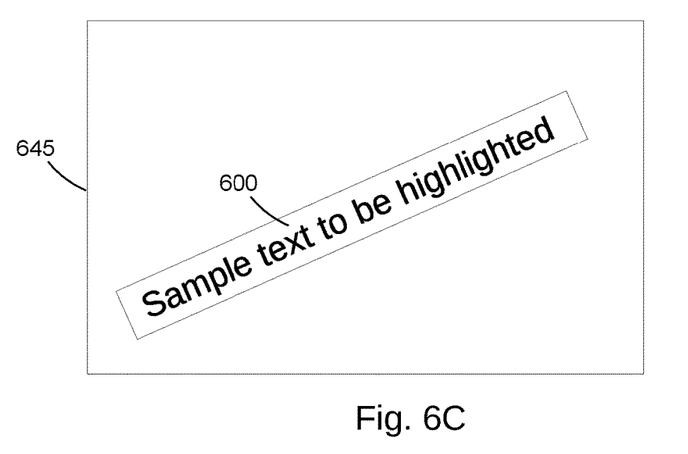
FIG. 6C is a schematic view of the context of the canvas element.

FIG. 6C illustrates a schematic view of a context 645 created in the markup language document. For example, in hypertext markup language 5 (HTML5) the pseudocode for generating a context may be "context=canvas.getContext('2d');" which provides a two-dimensional rendering context for a drawing surface of the canvas element. Although HTML may be the markup language referenced herein, it is merely exemplary and not to be understood as limiting, as any markup language known in the art may be used. For example, other markup languages may including, but not limited to, extensible hypertext markup language (XHTML), keyhole markup language (KML), scalable vector graphics (SVG), etc.

The context 645 of the canvas element may then be used for drawing various shapes, text, images, etc., including highlighting the text element 600 described herein. Once the context 645 is created, the X, Y coordinates of the corners (upper left 610, upper right 615, lower left 620, and lower right 625) of the bounding box 605 may be used to determine a point at which the text element 600 starts, in relationship to the center of the canvas. The X, Y coordinates of the corners (upper left 610, upper right 615, lower left 620, and lower right 625) of the bounding box 605 may also be used to determine a point at which the text element 600 starts, in relationship to the origin (e.g. the upper left) of the canvas.

Figure 6D:
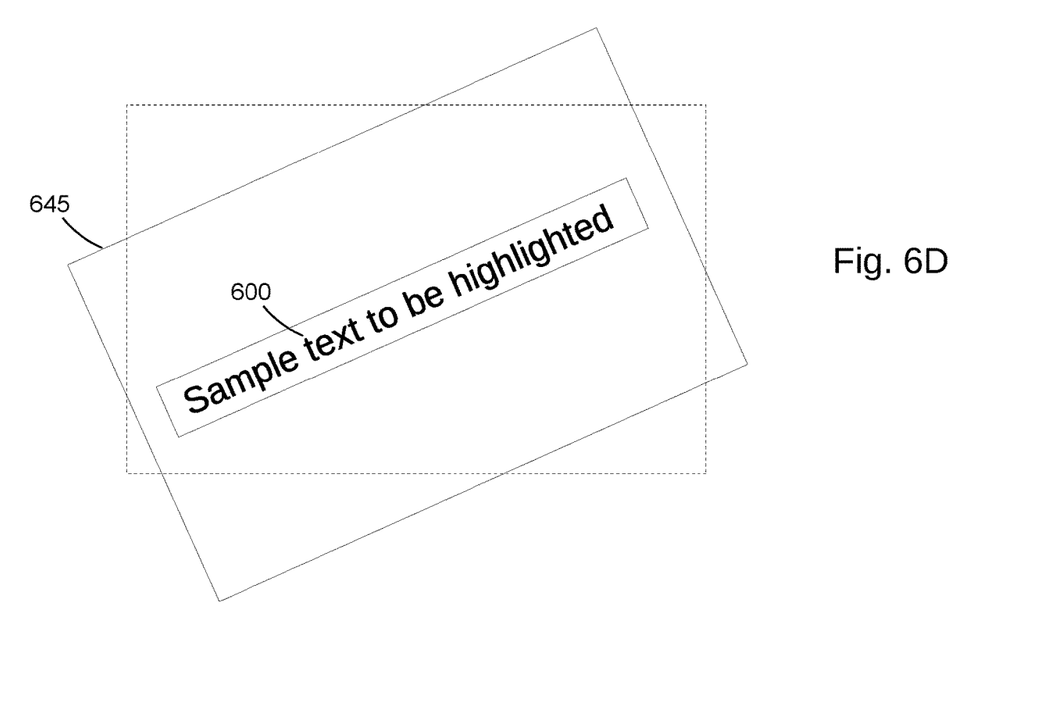
FIG. 6D is a schematic view of a rotated context of the canvas element.
Figure 6E:
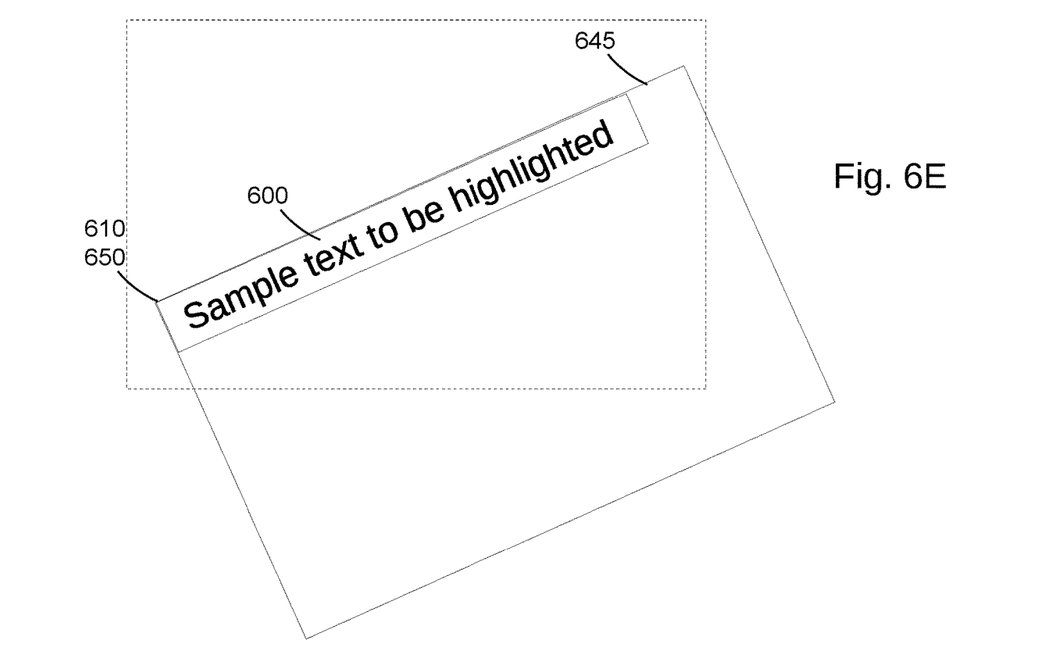
FIG. 6E is a schematic view of a translated context of the canvas element.

FIGS. 6D-6E illustrate what may be a multi-step process of moving the canvas to the starting point (e.g. the upper left corner 610) of the text element 600 to be highlighted. Specifically, FIG. 6D illustrates rotating the canvas. The angle of the rotation of the canvas may be identical to that of the angle of rotation identified using the slope 630 of the text element 600, so that the plane of canvas aligns with the text element 600. For example, in HTML5 the pseudocode may be "context.rotate(radian measurement of angle of rotation);". FIG. 6E illustrates the translating the canvas, such that each point of the text element 600 may be moved in the same direction for the same distance. In some instances, the translation may be so that the upper left corner 650 of the canvas aligns with the upper left corner 610 of the of text element 600, as illustrated in FIG. 6E. As a non-limiting example, in HTML5 the pseudocode may be "context.translate (X, Y);" where X, Y represent the amount to be moved in each of the X-axis and the Y-axis.

Figure 6F:
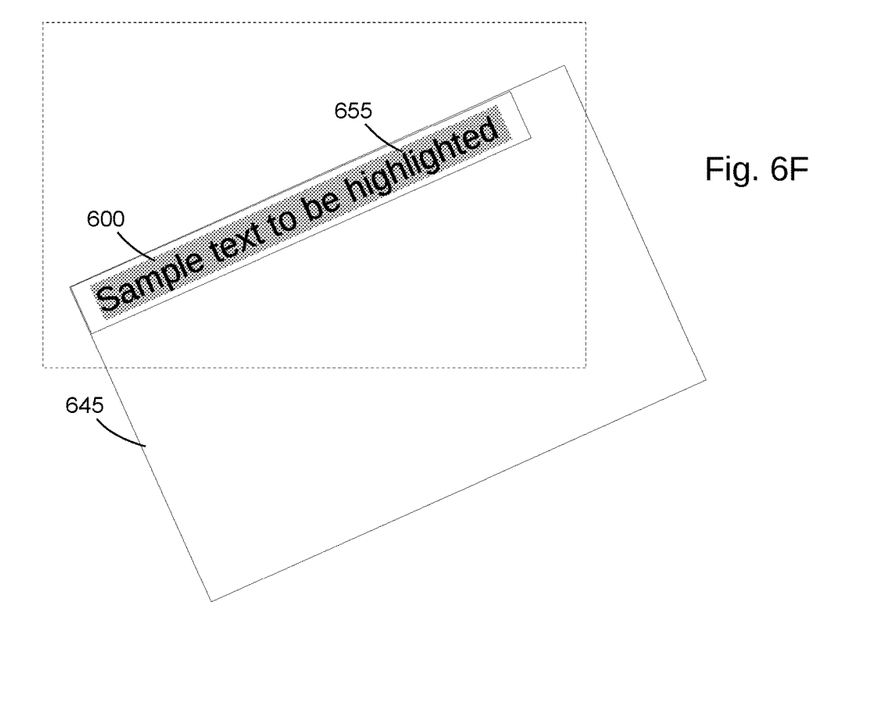
FIG. 6F is a schematic view of the generated highlighted text element on the rotated and translated canvas.
Figure 6G:
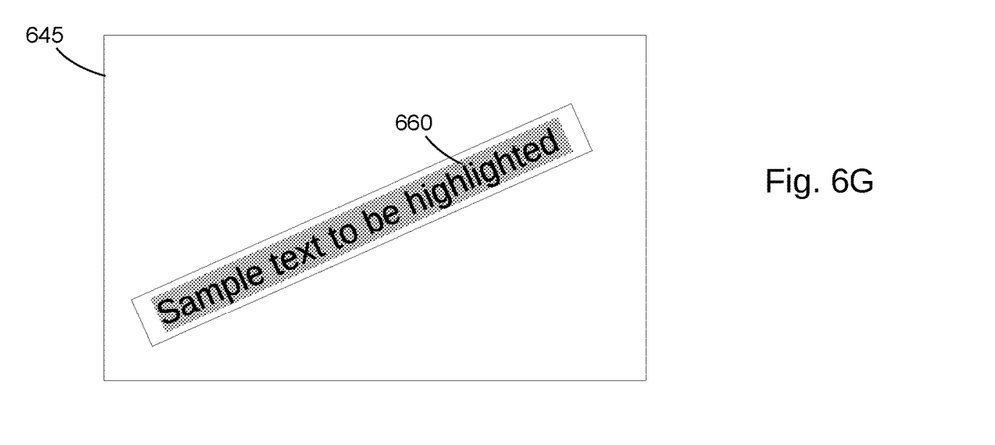
FIG. 6G is a schematic view of the restored context of the canvas element with the highlighted canvas element overlaying at least a part of the text element.

FIG. 6F illustrates a text highlighting element 655 the text element 600. For example, in some instances, the translation described herein may orient the upper left corner 650 of the canvas in such a way that it aligns with the upper left corner 610 of the of text element 600 (as illustrated in FIG. 6E), this alignment allows the text highlighting element 655 to be added at an angle of 0 degrees or 90 degrees relative to the rotated and translated canvas. As a non-limiting example, in HTML5 the pseudocode may be "context.fillStyle='rgba (255, 255, 0, 0.4)'; context.fillRect (0, 0, width height);". The text highlighting element 655 may be colored highlighting over the entirety of the text element 600, as illustrated in FIG. 6F, but this is not intended to be limiting. In other instances, the highlighting may be in form of underling the text element 600, crossing through the text element 600, or any other marking known in the art. FIG. 6G illustrates restoring the context 645 to its original position, leaving the text element 600 in its original angled position with a text highlighting element 660 overlaying it.

While particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A computer-implemented method for highlighting text in an image disposed in a markup language document, the method comprising:
   obtaining, by a processor, location data identifying a location, size and orientation of a text element in the image, wherein the text element is oriented in a direction that is non-orthogonal to vertical and horizontal axes of the image;
   obtaining, by the processor, a context for a canvas element in the document;
   rotating, by the processor, the context for the canvas element to align the context to the orientation of the text element using the location data;
   translating, by the processor, the context for the canvas element to the location of the text element using the location data; and
   generating, by the processor, a text highlighting element having a size that at least partially overlays the text element on the rotated and translated canvas using the location data.

2. The computer implemented method of claim 1 further including:
   saving, by the processor, the context for the canvas element in the document, wherein the text element is oriented in the direction that is non-orthogonal to vertical and horizontal axes of the image; and
   clearing, by the processor, the context for the canvas element prior to rotating and translating the context for the canvas element.

3. The computer implemented method of claim 2 further including restoring, by the processor, the context of the canvas element such that the text element is reoriented in the direction that is non-orthogonal to vertical and horizontal axes of the image following the generation of the text highlighting.

4. The computer implemented method of claim 1, wherein the text element in the image is one of a plurality of text elements in the image and wherein first and second text elements of the plurality of text elements are oriented in first and second directions that are non-orthogonal to vertical and horizontal axes of the image.

5. The computer implemented method of claim 4 further comprising repeating the location data obtaining, the context obtaining, the rotating, the translating and the generating steps for each of the first and second text elements.

6. The computer implemented method of claim 1, wherein rotating the context for the canvas element to align the context to the orientation of the text element using the location data further includes determining, by the processor, an angle of the text element in the image using the location data.

7. The computer implemented method of claim 6, wherein the angle of the text element equals $\tan^{-1}$ (slope), wherein the slope equals: (a Y coordinate of a top right corner of a bounding box–a Y coordinate of a top left corner of the bounding box)/(an X coordinate of the top right corner of the bounding box–an X coordinate of the top left corner of the bounding box).

8. An apparatus, comprising:
   at least one processing unit; and
   program code configured upon execution by the at least one processing unit to highlight text in an image disposed in a markup language document including:
   obtaining location data identifying a location, size and orientation of a text element in the image, wherein the text element is oriented in a direction that is non-orthogonal to vertical and horizontal axes of the image;
   obtaining a context for a canvas element in the document;
   rotating the context for the canvas element to align the context to the orientation of the text element using the location data;
   translating the context for the canvas element to the location of the text element using the location data; and
   generating a text highlighting element having a size that at least partially overlays the text element on the rotated and translated canvas using the location data.

9. The apparatus of claim 8, wherein the program code configured upon execution by the at least one processing unit to highlight text in an image disposed in a markup language document further includes:
   saving the context for the canvas element in the document, wherein the text element is oriented in the direction that is non-orthogonal to vertical and horizontal axes of the image; and
   clearing the context for the canvas element prior to rotating and translating the context for the canvas element.

10. The apparatus of claim 8, wherein the program code configured upon execution by the at least one processing unit to highlight text in an image disposed in a markup language document further includes restoring the context of the canvas element such that the text element is reoriented in the direction that is non-orthogonal to vertical and horizontal axes of the image following the generation of the text highlighting.

11. The apparatus of claim 8, wherein the text element in the image is one of a plurality of text elements in the image and wherein first and second text elements of the plurality of text elements are oriented in first and second directions that are non-orthogonal to vertical and horizontal axes of the image.

12. The apparatus of claim 11 wherein the program code configured upon execution by the at least one processing unit to highlight text in an image disposed in a markup language document further includes repeating the location data obtaining, the context obtaining, the rotating, the translating and the generating steps for each of the first and second text elements.

13. The apparatus of claim 8, wherein rotating the context for the canvas element to align the context to the orientation of the text element using the location data further includes determining an angle of the text element in the image using the location data.

14. The apparatus of claim 13, wherein the angle of the text element equals $\tan^{-1}$ (slope), wherein the slope equals: (a Y coordinate of a top right corner of a bounding box–a Y coordinate of a top left corner of the bounding box)/(an X coordinate of the top right corner of the bounding box–an X coordinate of the top left corner of the bounding box).

15. A program product, comprising:
a computer readable medium; and
program code stored on the computer readable medium and configured upon execution by at least one processing unit to highlight text in an image disposed in a markup language document including by:
obtaining location data identifying a location, size and orientation of a text element in the image, wherein the text element is oriented in a direction that is non-orthogonal to vertical and horizontal axes of the image;
obtaining a context for a canvas element in the document;
rotating the context for the canvas element to align the context to the orientation of the text element using the location data;
translating the context for the canvas element to the location of the text element using the location data; and
generating a text highlighting element having a size that at least partially overlays the text element on the rotated and translated canvas using the location data.

16. The program product of claim 15, wherein the program code configured upon execution by the at least one processing unit to highlight text in an image disposed in a markup language document further includes:
saving the context for the canvas element in the document, wherein the text element is oriented in the direction that is non-orthogonal to vertical and horizontal axes of the image; and
clearing the context for the canvas element prior to rotating and translating the context for the canvas element.

17. The program product of claim 15, wherein the program code configured upon execution by the at least one processing unit to highlight text in an image disposed in a markup language document further includes restoring the context of the canvas element such that the text element is reoriented in the direction that is non-orthogonal to vertical and horizontal axes of the image following the generation of the text highlighting.

18. The program product of claim 15, wherein the text element in the image is one of a plurality of text elements in the image and wherein first and second text elements of the plurality of text elements are oriented in first and second directions that are non-orthogonal to vertical and horizontal axes of the image.

19. The program product of claim 18, wherein the program code configured upon execution by the at least one processing unit to highlight text in an image disposed in a markup language document further includes repeating the location data obtaining, the context obtaining, the rotating, the translating and the generating steps for each of the first and second text elements.

\* \* \* \* \*